July 27, 1954
C. A. MARKS
2,684,991
TERMINAL CONNECTION FOR LEAD STORAGE BATTERIES
AND METHOD AND APPARATUS FOR FORMING THE SAME
Filed Oct. 31, 1950
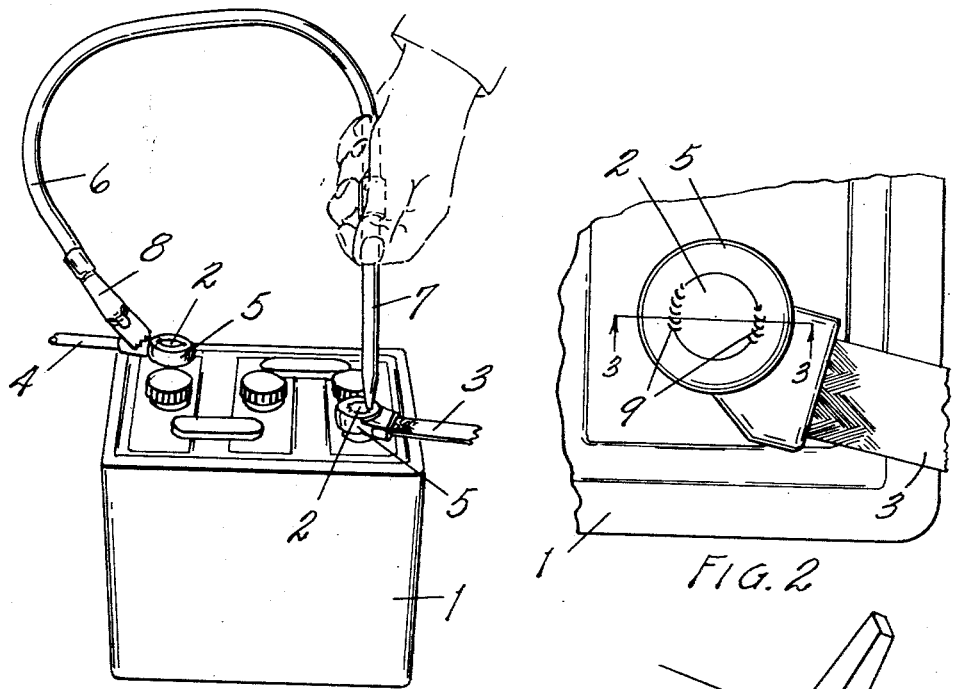
Fig. 1
Fig. 2
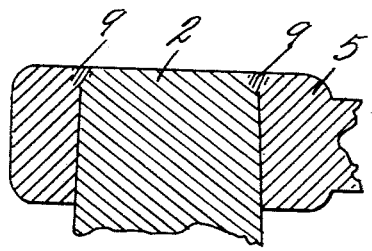
Fig. 3
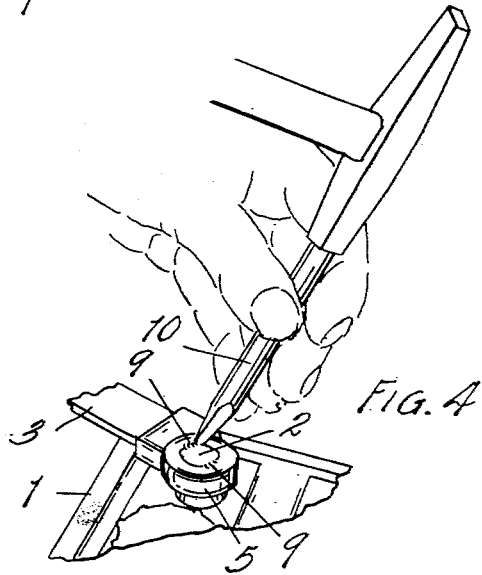
Fig. 4
INVENTOR.
Charles A. Marks
BY
Attorney Patented July 27, 1954

2,684,991

UNITED STATES PATENT OFFICE 2,684,991

TERMINAL CONNECTION FOR LEAD STORAGE BATTERIES AND METHOD AND APPARATUS FOR FORMING THE SAME

Charles A. Marks, Elkhart, Ind.

Application October 31, 1950, Serial No. 193,270

1 Claim. (Cl. 136—174)

This invention relates to improvements in terminal connection for lead storage batteries and method and apparatus for forming the same.

The principal objects of this invention are:

First, to provide an electrical connection between the terminal posts and current carrying cables of a wet storage battery which is continuously metallic and autogenous at the terminal post so as to prevent the formation of corrosion between the terminal post and the cable connector.

Second, to provide a method of integrally fusing a cable connector ring to the terminal post of a battery which employs the current of the battery itself and does not require an external source of energy.

Third, to provide a tool adapted to be electrically connected at one end to one terminal of a wet storage battery and applied at its other end to the connection between the other terminal of the battery and a conducting cable to heat and fuse the adjacent portions of the terminal and cable connector.

Fourth, to provide a terminal connection for a wet storage battery which is permanently and positively electrically conducting and not subject to interference from corrosion while at the same time being readily broken for removal of the battery.

Other objects and advantages relating to my invention will be apparent from a consideration of the following description and claim. The drawings, of which there is one sheet, illustrate a preferred form of my terminal connection and a preferred form of tool and method for forming the same.

Fig. 1 is a perspective view of a wet storage battery with my tool applied thereto for forming the permanent connection to one of the battery cables operatively associated with the battery and terminal.

Fig. 2 is an enlarged fragmentary plan view of one of the terminal connections.

Fig. 3 is an enlarged vertical cross sectional view through the terminal connection taken along the plane of the line 3—3 in Fig. 2.

Fig. 4 is a fragmentary perspective view illustrating the method of removing or breaking the terminal connection when necessary.

As is well known, the terminal posts of wet storage batteries are commonly made of soft lead or lead alloy and are commonly connected to the conducting cables associated with the battery by means of a connector ring permanently and electrically connected to the end of the cable. The connector ring is also usually formed of a soft lead alloy but of slightly harder composition than the terminal post. The terminal posts are upwardly tapered and the connector rings are correspondingly internally tapered so that the connector ring may be tightly wedged on the terminal post. The lead composition of the terminals and the connector rings tends to resist the formation of corrosion and scale, and the wedging engagement between the connector elements further resists the formation of scale between the abutting surfaces. Nonetheless the corrosive action of wet storage batteries is so pronounced that very frequently sufficient corrosive scale accumulates between the terminal post and the connector ring to materially or entirely block the passage of current between the terminal post and the connector ring.

I have found that the metal of battery connector rings may be integrally and autogenously fused with the adjacent metal of battery terminal posts by the application of heat along the joint between these elements. The continuous character of the metal connection between the post and the ring then effectively and absolutely prevents the formation of any corrosion or scale which will break or interfere with the electrical connection. The fusing of the adjacent metal parts is desirably accomplished by the internal application of heat within the parts themselves. In other words, an electric current caused to pass through the metal of the ring and terminal will generate sufficient heat within the metals to cause them to become fluid and merge together. I have further found that sufficient electrical energy for fusing the cable connectors of a battery to the battery terminals is readily available within the battery itself without detrimentally affecting the condition or charge of the battery.

In the drawings I have illustrated a lead plate, wet storage battery 1 having upwardly tapered terminal posts 2. The usual ground connector strap 3 and live cable conductor 4 are connected to the terminal posts by connector rings 5 as is the usual case with batteries of this type. After the connector rings 2 have been driven or pressed on the terminal posts, I employ a terminal fusing tool to short circuit the battery across its terminals to fuse the connector rings to the terminals. The tool consists of a length of flexible electrically conducting cable 6 having a pointed metallic prod 7 on one end thereof. The other end of the cable carries a spring clamp 8 which will effectively grip and make electrical contact with either of the connecting cables 3 or 4 or the terminals 2. Desirably the conducting cable 6 of the fusing tool is of such a size as to effectively carry the full ampere output of the battery without becoming heated itself. By applying the prod 7 to one or more portions of the junction line between a connector ring and its associated terminal the entire output of the battery is directed through a relatively small cross sectional area of the terminal to heat up the metal in the terminal and the ring and cause it to fuse as at 9. After the metal has solidified, no amount of corrosion which may accumulate around the terminal and connector ring can break or interfere with the continuous electrical connection formed through the fused metal. The fused portion or portions 9 extend along only a short arc of the terminal and thus are easily chipped or cut away as in Fig. 4 to remove the ring when necessary. At the same time the fused area which is integral with both the ring and terminal is sufficient to carry the full current of the battery and maintain the mechanical connection between the terminal and ring regardless of corrosion of the other parts of the connection.

When it becomes necessary to remove the battery from its operating circuit for recharging or replacement, it is a simple matter to sever or divide the fused joint 9 by driving the edge of a cold chisel 10 therethrough as is illustrated in Fig. 4. As is best illustrated in Fig. 3, the fused area 9 is concentrated and limited to the extreme upper edge of the connection between the terminal and the connector ring so as to be readily engaged and broken by the cold chisel without damage to either the ring or the terminal post.

Having thus described my invention, what I claim as new and desire to secure by Letters Patent is:

The method of electrically connecting a battery cable having a connector ring of lead alloy thereon to the terminal of a lead battery which comprises the steps of mechanically placing the connector ring of the cable directly over said terminal in closely adjacent capped relation, and fusing adjacent portions of said ring and terminal along a fraction only of the circumference of the terminal by passing the pointed end of an electrical conductor in arcing current carrying relation to said portions while the other end of said conductor is electrically connected to the opposite terminal of the said battery to melt adjacent portions of the metal of said ring and terminal, and thereafter permitting the melted metal to solidify in an integral mechanical and electrically continuous connection between a short segment of said ring and the adjacent portion of said terminal at the tops thereof, said connection being capable of resisting mechanical breakage by corrosion of other portions of the ring and terminal and being exposed so as to be easily cut away for intentional release of the connection.

References Cited in the file of this patent

UNITED STATES PATENTS

| Number | Name | Date |
| --- | --- | --- |
| 854,817 | Ford | May 28, 1907 |
| 994,744 | Hall | June 13, 1911 |
| 1,248,443 | Bowler | Dec. 4, 1917 |
| 1,265,980 | Weinmann | May 14, 1918 |
| 1,451,500 | Frohbieter | Apr. 10, 1923 |
| 1,500,663 | Ball | July 8, 1924 |
| 1,634,280 | Zastrow | July 5, 1927 |
| 1,646,909 | Gossling | Oct. 25, 1927 |
| 1,708,808 | Taylor | Apr. 9, 1929 |
| 1,854,328 | Binder | Apr. 19, 1932 |
| 1,997,963 | Carlile | Apr. 16, 1935 |
| 2,133,371 | Ballard | Oct. 18, 1938 |
| 2,136,005 | Dixon | Nov. 8, 1938 |
| 2,136,814 | Flynn | Nov. 15, 1938 |